(12) United States Patent
Ishikawa et al.

(10) Patent No.: US 11,714,488 B2
(45) Date of Patent: Aug. 1, 2023

(54) CONTROLLER APPARATUS, METHOD OF CONTROLLING CONTROLLER APPARATUS, AND PROGRAM

(71) Applicant: Sony Interactive Entertainment Inc., Tokyo (JP)

(72) Inventors: Kiyotaka Ishikawa, Tokyo (JP); Shin Kimura, Tokyo (JP); Masaaki Tonogai, Tokyo (JP); Takuro Sawada, Tokyo (JP); Kazuyoshi Enomoto, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/851,200

(22) Filed: Apr. 17, 2020

(65) Prior Publication Data
US 2020/0341549 A1 Oct. 29, 2020

(30) Foreign Application Priority Data

Apr. 26, 2019 (JP) ................................. 2019-086346

(51) Int. Cl.
*A63F 13/211* (2014.01)
*A63F 13/214* (2014.01)
(Continued)

(52) U.S. Cl.
CPC ............ *G06F 3/014* (2013.01); *A63F 13/211* (2014.09); *A63F 13/214* (2014.09);
(Continued)

(58) Field of Classification Search
CPC ...... G06F 3/014; G06F 3/0418; G06F 3/0346; G06F 3/044; A63F 13/22; A63F 13/21;
(Continued)

(56) References Cited

U.S. PATENT DOCUMENTS

2008/0158174 A1* 7/2008 Land ..................... G06F 3/044
345/173
2009/0315838 A1 12/2009 Geiger
(Continued)

FOREIGN PATENT DOCUMENTS

CN 102257457 A 11/2011
JP 2019046040 A 3/2019
(Continued)

OTHER PUBLICATIONS

Notice of Reasons for Refusal for corresponding JP Application No. 2019-086346, 8 pages, dated Feb. 1, 2021.
(Continued)

*Primary Examiner* — Temesghen Ghebretinsae
*Assistant Examiner* — Karin Kiyabu
(74) *Attorney, Agent, or Firm* — Matthew B. Dernier, Esq.

(57) ABSTRACT

A controller apparatus attached to a hand of a user and having a plurality of sensors, the controller apparatus includes: a determination section configured to determine whether or not each of the sensors meets a predetermined condition specifying that a finger of the user is not touching the sensor; and a calibration section configured to calibrate the sensor found to meet the predetermined condition as a result of the determination.

16 Claims, 6 Drawing Sheets

(51) Int. Cl.
*G06F 3/0346* (2013.01)
*G06F 3/01* (2006.01)
*G06F 3/041* (2006.01)
*G06F 3/044* (2006.01)

(52) U.S. Cl.
CPC .......... *G06F 3/0346* (2013.01); *G06F 3/0418* (2013.01); *G06F 3/044* (2013.01)

(58) Field of Classification Search
CPC ...... A63F 13/24; A63F 13/211; A63F 13/214; G05G 9/047; G01D 18/00; G05B 19/042
See application file for complete search history.

(56) References Cited

U.S. PATENT DOCUMENTS

| | | | |
|---|---|---|---|
| 2011/0242038 A1 | 10/2011 | Kakuta | |
| 2013/0194235 A1* | 8/2013 | Zanone | G06F 3/0418 345/175 |
| 2015/0138124 A1* | 5/2015 | Wang | G06F 3/0488 345/173 |
| 2016/0062489 A1* | 3/2016 | Li | A63F 13/21 345/163 |
| 2016/0278133 A1* | 9/2016 | Caine | H04W 76/10 |
| 2017/0031521 A1* | 2/2017 | Drake | G06F 3/0446 |
| 2018/0267653 A1* | 9/2018 | Holman | G06F 3/0445 |
| 2020/0276497 A1* | 9/2020 | Nietfeld | A63F 13/22 |
| 2021/0061194 A1* | 3/2021 | Sugawa | B60R 16/02 |

FOREIGN PATENT DOCUMENTS

| | | |
|---|---|---|
| KR | 100880522 B1 | 1/2009 |
| WO | 2015002298 A | 1/2015 |

OTHER PUBLICATIONS

Office Action for corresponding CN Application No. 202010311495.5, 9 pages, dated Sep. 17, 2021.

* cited by examiner

FIG.5

| TARGET FOR DETERMINATION | SENSORS LINKED TO CONDITION |
|---|---|
| SENSOR 160a | SENSORS 160b, 160c, 160d |
| SENSOR 160b | SENSORS 160c, 160d |
| SENSOR 160c | SENSORS 160a, 160b, 160d |
| SENSOR 160d | SENSORS 160a, 160b |
| ⋮ | ⋮ |

CONTROLLER APPARATUS, METHOD OF CONTROLLING CONTROLLER APPARATUS, AND PROGRAM

BACKGROUND

The present disclosure relates to a controller apparatus, a method of controlling the controller apparatus, and a program.

Controller apparatuses such as those for home-use game machines that are connected with an information processing apparatus to accept instructions from a user for controlling the information processing apparatus include sensors such as buttons and touch sensors capable of detecting touches of the user's fingers.

Some of the sensors of such controller apparatuses have their detected values varied depending on the environment. For example, there are sensors such as electrostatic capacitance sensors that output detected values in keeping with spatial position displacements between fingers and the sensor. The detected values responding to such displacements can vary depending on ambient temperature. This requires the sensors to be calibrated as needed.

SUMMARY

Meanwhile, sensors need to be calibrated when they are completely away from user's fingers. This has required a process of prompting the user to keep the fingers off buttons and other controls of a controller before calibration can be started. For example, although a rise in temperature during a game play may bring about a situation where it is necessary to calibrate the sensors, performing the calibration during execution of an application would interfere with user's operations. This is not desirable.

The present disclosure has been made in view of the above circumstances. It is desirable to provide a controller apparatus that performs calibration without causing a user to be aware of it, a method of controlling the controller apparatus, and a program.

According to an embodiment of the present disclosure, there is provided a controller apparatus attached to a hand of a user and having a plurality of sensors. The controller apparatus includes: a determination section configured to determine whether or not each of the sensors meets a predetermined condition specifying that a finger of the user is not touching the sensor; and a calibration section configured to calibrate the sensor found to meet the predetermined condition as a result of the determination.

Thus, according to an embodiment of the present disclosure, calibration is carried out without a user being aware of it.

BRIEF DESCRIPTION OF THE DRAWINGS

FIG. 5 is an explanatory diagram depicting exemplary management table information in which conditions are set and which is held by the controller apparatus embodying the present disclosure.

DETAILED DESCRIPTION OF THE PREFERRED EMBODIMENT

Figure 1:
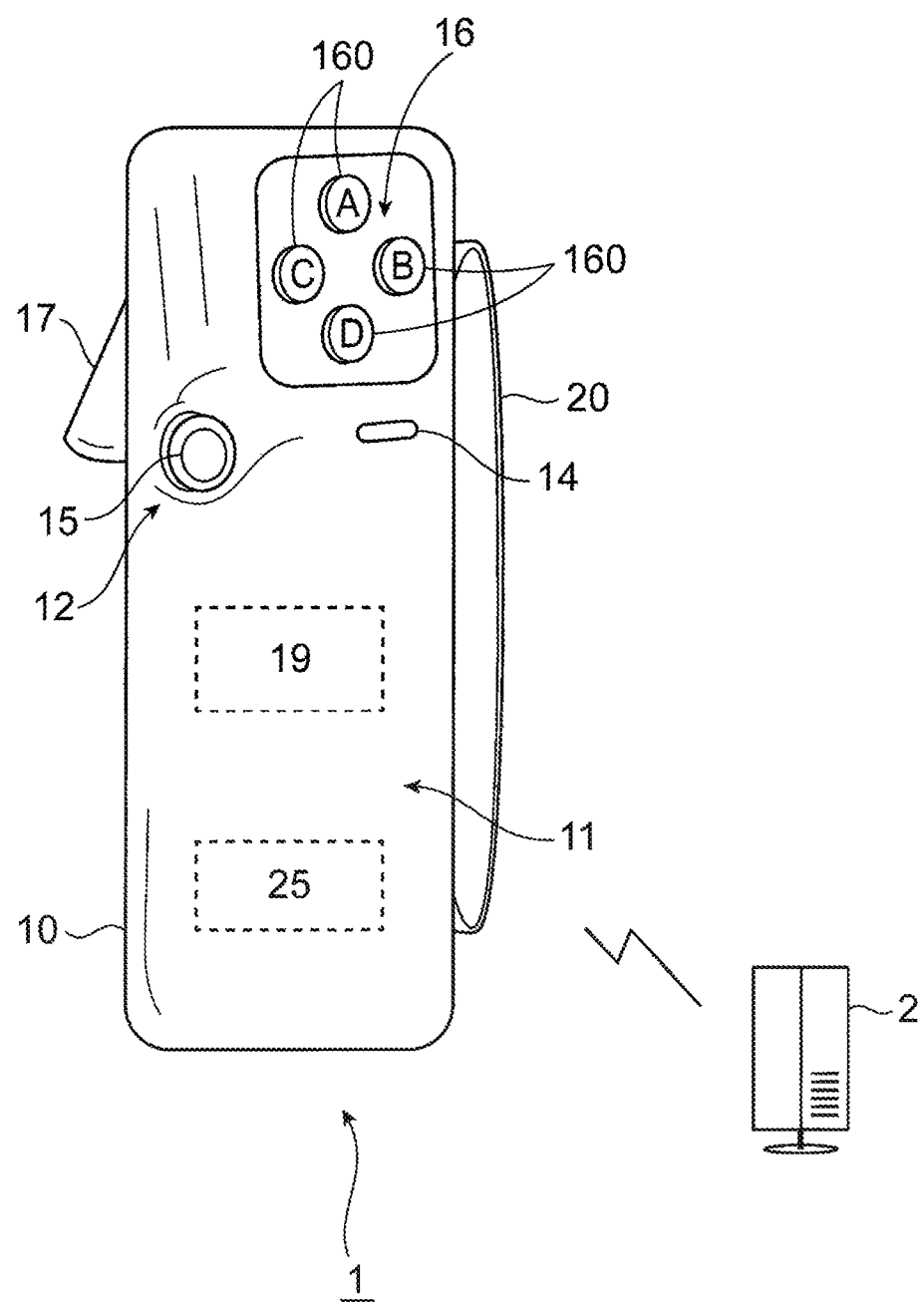
FIG. 1 is a block diagram depicting a configuration of a controller apparatus embodying the present disclosure, and exemplary connections of the control apparatus.

A preferred embodiment of the present disclosure is described below with reference to the accompanying drawings. As depicted in FIG. 1, a controller apparatus 1 embodying the present disclosure includes a controller body 10 and a fixing implement 20 that secures the controller body 10 to a user's hand. The controller apparatus 1 is connected communicably with an information processing apparatus 2 in wired or wireless fashion. It is to be noted that in the ensuing description of the embodiment, the sizes, proportions, and arrangements of the parts explained therein are only examples and are not limitative of this embodiment.

The fixing implement 20 of the controller apparatus 1 is, for example, a circular belt member of which the two ends are fixed to two locations, separated longitudinally from each other, of the controller body 10. A user puts four fingers from the index finger to the little finger of his or her hand through a gap between the fixing implement 20 and the controller body 10 and tightens the belt member of the fixing implement 20 (i.e., narrows the gap between the fixing implement 20 and the controller body 10). With the controller body 10 thus kept in contact with the user's palm, the controller body 10 is attached to the user's hand. When the controller apparatus 1 is attached to the user's hand by the fixing implement 20 in this manner, the user grips the controller body 10 (i.e., holds the controller body 10 by wrapping his or her fingers around it). Then releasing the grip on the controller body 10 by extending the fingers still keeps it from falling off the user's hand.

The controller body 10 includes a grip part 11 that can be gripped with at least part of the user's fingers (from the index finger to the little finger in this case) put through the fixing implement 20, and an operation part 12. The grip part 11 has a substantially polygonal column shape. The grip part 11 is formed integrally with the operation part 12. The front side of the operation part 12 (i.e., the side that can be operated by the thumb when the user naturally grips the controller apparatus 1) includes a button 14, a joystick 15, and a sensor part 16. The back side of the operation part 12 (the side on which the fingers from the index finger to the little finger are positioned when the user naturally grips the controller apparatus 1) may include a swing button 17 and a sensor part 18. The controller apparatus 1 is configured to have a processor 19 inside.

Here, the joystick 15 and the sensor part 16 are positioned in such a manner as to be reached by the user's thumb when the user attaches the controller apparatus 1 to his or her hand by the fixing implement 20 and grips the grip part 11. That is, the user operates the swing button 17 of the operation part 12 with the index finger while operating the joystick 15 or the sensor part 16 by the touch of the thumb.

The sensor part 16 includes multiple sensors 160a, 160b, etc. FIG. 1 depicts an example in which four sensors 160a, 160b, 160c, and 160d are provided. Each of the sensors 160 (generically referred to as the sensor 160 hereunder in the case where there is no need to distinguish the individual sensors) may be an electrostatic capacitance sensor. The sensor 160 outputs a sensor signal indicative of detected values based on relative spatial displacements between the sensor and the user's finger (In the ensuing description, this will be the type of sensor whenever reference is simply made to the sensor. However, this is not limitative of the type of sensor. The sensor may be of the type that detects temperature or the type that measures the distance to the nearest object (including the user's finger). Alternatively, the sensor here may be a pyroelectric sensor or any of other diverse types of sensors.).

In this example, the detected value indicated by the sensor signal is relatively large when the user's finger is close to the sensor and reaches a predetermined maximum vale when the user's finger touches the sensor. The sensor 160 has the detected value varied in magnitude with respect to relative spatial displacements between the sensor and the user's finger depending on the circumstances such as wiring conditions and temperature variations.

Figure 2:
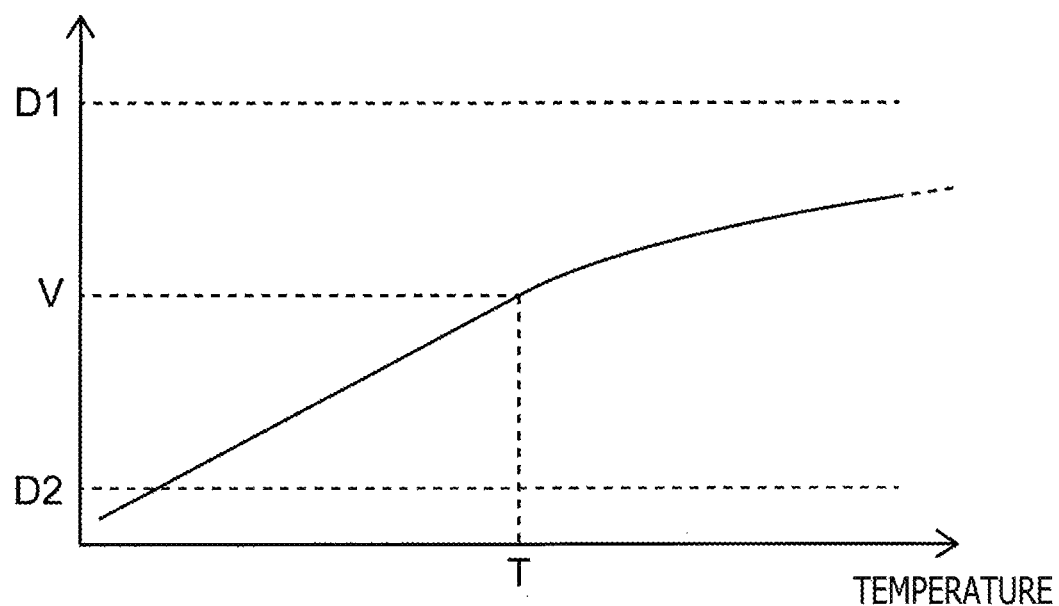
FIG. 2 is an explanatory diagram depicting exemplary values detected by a sensor included in the controller apparatus embodying the present disclosure.

For example, as depicted in FIG. 2, the detected value of the sensor 160 becomes larger the higher the ambient temperature even when the user's finger is not touching the sensor 160 (when the user's finger is sufficiently distant from the sensor, so that ideally the detected value should be sufficiently low).

In a case where the swing button 17 is provided on the back side, the swing button 17 is positioned in such a manner as to be reached by the user's index finger when the user grips the grip part 11 as described above.

Figure 3:
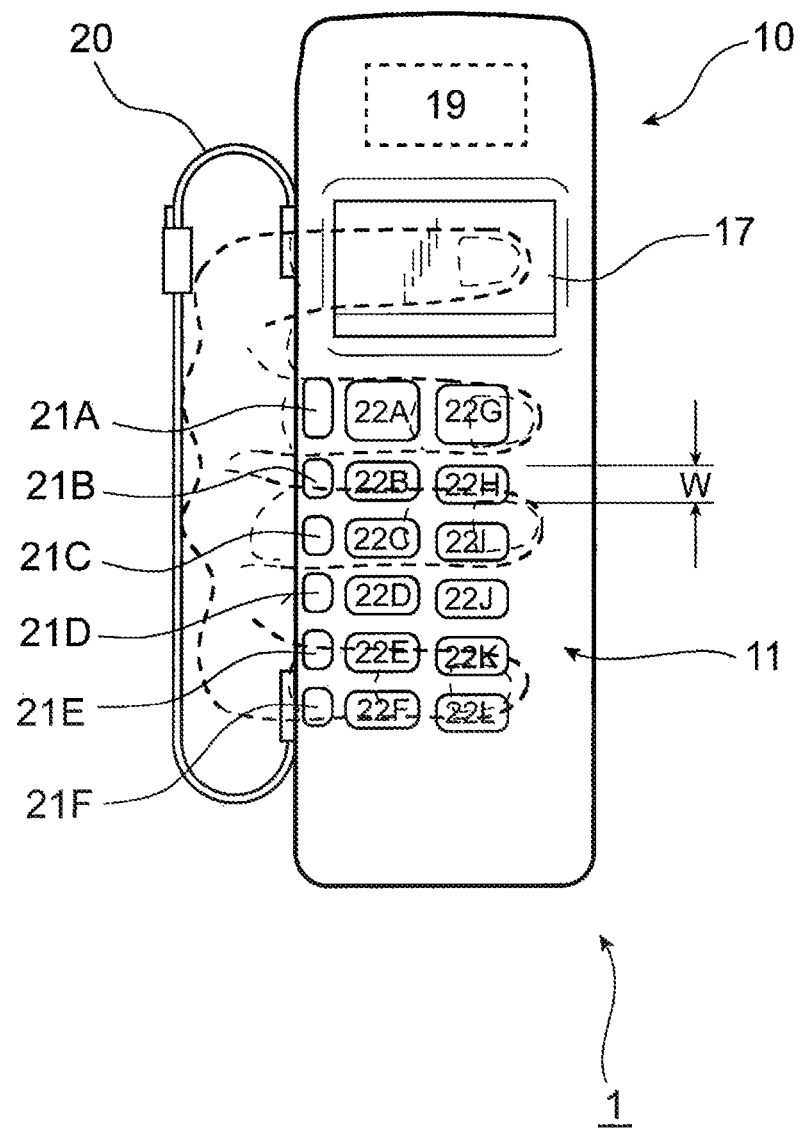
FIG. 3 is an explanatory diagram depicting an exemplary arrangement of sensors of the controller apparatus embodying the present disclosure.

Further, the sensor part 18 provided on the back side includes multiple sensors such as electrostatic capacitance sensors similar to the sensors 160 in the sensor part 16, which output detected values with respect to the magnitude of relative spatial displacements between the sensor and the user's finger. Specifically with this embodiment, as depicted in FIG. 3, multiple first sensors 21 are arrayed in a row in the longitudinal direction of the grip part 11 over a distance exceeding the average width of an adult's palm and relatively near the fixing implement 20 of the grip part 11. Although the example in FIG. 3 indicates six first sensors 21 arrayed in a row, this is not limitative of the number of sensors that may be provided.

Multiple second sensors 22 are discretely arranged (so that their ranges of detection do not overlap with each other) at those positions on the controller body 10 that are touched by the user's fingers from the index finger to the little finger when the user grips the controller body 10, each of the second sensors 22 detecting the distance to each of the user's fingers.

In the example of FIG. 3, the multiple second sensors 22 are arranged in a matrix of 2 rows in the longitudinal direction of the grip part 11 and 6 columns in the crosswise direction thereof. However, the matrix arrangement of 2 rows and 6 columns is not limitative of this embodiment. The multiple second sensors 22 may be arranged as desired as long as they come into contact with the user's fingers ranging from their balls to their tips on the controller body 10 when the user grips the grip part 11 thereof, each of the sensors being arranged to detect spatial displacements between the sensor and the finger.

In the example of FIG. 3, each of the first sensors 21 is arranged in the row direction of the second sensors 22. The first and the second sensors 21 and 22 are provided as electrostatic sensors constituting a matrix of 6 rows and 3 columns as a whole (in an oblique grating pattern).

The first sensors 21 are positioned in such a manner as to be always in contact with the roots of the user's fingers when the user grips the grip part 11 while fastening his or her hand with the fixing implement 20. Thus, as long as the user has the controller apparatus 1 attached with the fixing implement 20 in order to use the controller apparatus 1, those of the multiple first sensors 21 that correspond to the width of the user's hand keep outputting detected values indicating that the fingers are touching the sensors.

The processor 19 is a program-controlled device such as a microcomputer that operates in accordance with a program stored in a storage medium such as an internal memory of the processor 19. The program may be stored in a computer-readable nonvolatile recording medium when offered, before being installed in a memory of the processor 19.

The processor 19 of this embodiment determines whether or not each of the sensors 160, first sensors 21, and second sensors 22 in the sensor parts 16 and 18 meets a predetermined condition specifying that the user's finger is not touching the sensor in question. The condition may vary from one sensor to another. Details of the condition will be discussed later in conjunction with how the processor 19 operates when performing the determination.

The processor 19 calibrates a sensor 160, a first sensor 21, or a second sensor 22 found to meet the predetermined condition as a result of the above determination. The calibration is carried out typically as follows.

That is, the processor 19 is set beforehand with threshold values D1 and D2 for the detected values of each of the sensors 160, for example, the threshold value D1 being used in detecting whether the finger is touching the sensor, the threshold value D2 serving as a criterion for a detected value to be output when the finger is sufficiently distant from the sensor. On the basis of a detected value V represented by the signal output from the sensor 160, the processor 19 presents the value of a spatial displacement S between the sensor 160 and the user's finger (the value indicates how close the finger is to the sensor) using the expression $S=(V-D2)/(D1-D2)$, for example. The processor 19 obtains the value S for each of the sensors 160 and outputs the obtained value S to the information processing apparatus 2. When the value S is equal to or larger than "1" for a given sensor 160, the information processing apparatus 2 determines that the user's finger is touching the sensor 160. When the value S for a given sensor 160 is equal to or smaller than "0," the information processing apparatus 2 determines that the user's finger is away from the sensor 160. In the case where the value S is between "0" and "1," the information processing apparatus 2 determines the magnitude of the spatial displacement between the sensor 160 and the user's finger in accordance with the magnitude of the value S (the larger the value S, the nearer the user's finger is determined to be).

When calibrating a given sensor 160, the processor 19 sets the currently detected value as the threshold value D2 on the assumption that the finger is not touching the sensor 160. In this case, at a temperature T in FIG. 2, for example, even if the detected value of a given sensor 160 rises to a value V despite the sensor 160 not being touched by the finger (in this state, the information processing apparatus 2 determines that the finger is near the sensor 160), the processor 19 again sets the detected value V as the threshold value D2. This corrects the magnitude of the spatial displacement between the sensor 160 and the user's finger.

[Condition for the Determination]

Explained below is the process performed by the processor 19 to determine whether or not the sensors such as the sensors 160 each meet a predetermined condition specifying that the user's finger is not touching the sensor.

The condition may be set as follows. As an example for this embodiment, the sensors 160, first sensors 21, and second sensors 22 each assumed to be operated (or touched) by one finger are grouped for each of the sensors.

For example, the sensors 160 included in the sensor part 16 and provided on the front side may presumably be touched by the thumb and not by any other finger. Thus, the sensors 160 included in the sensor part 16 are classified as one group.

Alternatively, the sensors may be grouped dynamically. For example, depending on how many of the second sensors 22 are detecting a finger touch, it is determined which of the second sensors 22 detects a touch of which finger. On the basis of the result of the determination, the sensors may be grouped.

In the example of FIG. 3, if the first sensors 21A, 21B, 21C, and 21D detect touches of the user's fingers while the first sensors 21E and 21F do not detect touches of the fingers, then it may be determined that a user having hands of a relatively small size is using the controller apparatus 1. In this case, the user's index finger is assumed to operate the swing button 17, so that the second sensors 22A and 22G are determined to be within a range that can be touched by the user's middle finger. The second sensors 22C and 22I are determined to be within a range that can be touched by the user's annular finger. The second sensors 22D and 22J are determined to be within a range that can be touched by the user's little finger. In this case, the second sensors 22A and 22G are classified into a group G1, the second sensors 22C and 22I into another group G2, and the second sensors 22D and 22J into yet another group G3.

The processor 19 adopts, as the condition specifying that the user's finger is not touching a given sensor, a condition specifying that if that sensor is set to belong to a given group, the user's finger touches the sensors belonging to the same group.

For example, where the sensors 160 are arranged in positions A, B, C, and D as depicted in FIG. 1, if the user's finger is touching any one of these sensors 160, the processor 19 determines that the user's finger is not touching the other sensors 160 in the sensor part 16. If the user's finger is touching the sensor 160a, for example, the processor 19 determines that the user's finger is not touching the other sensors 160b, 160c, and 160d in the sensor part 16. At this time, the processor 19 calibrates the sensors 160 that meet the predetermined condition specifying that the user's finger is not touching the sensor, i.e., the sensors 160b, 160c, and 160d.

Still, even if the user's finger is touching the other sensors belonging to the same group, there may be cases where it is not appropriate to perform the calibration. For example, in the case where the middle finger is touching the second sensor 22G, the second sensor 22A is also touched (by the ball of the finger). Thus, the second sensor 22A should not be calibrated even in the case where the second sensors 22A and 22G belong to the same group and where the user's finger is touching the second sensor 22G.

Further, there may be cases where the above condition is not appropriate for the sensors 160 depending on their arrangement. For example, in a case where the user's finger is touching the sensor 160c in the position C in FIG. 1, there is a possibility that the user's finger (its ball) may touch or be near the sensor 160d in the position D. Thus, even in the case where the sensors 160c and 160d belong to the same group and where the user's finger is touching the sensor 160c, the sensor 160d should not be calibrated.

Thus, with this embodiment, each sensor may be set with a condition by which to determine that the user's finger is not touching this sensor depending on which sensor is touched by the user's finger as will be discussed below. Specifically, the processor 19 is provided beforehand with management table information such as that depicted in FIG. 5 and including the settings of that condition.

In the example of FIG. 5, the sensor 160a in the position A in FIG. 1 is set with the condition specifying that the user's finger is not touching this sensor if the user's finger is touching any one of the sensors 160b, 160c, and 160d in the positions B, C, and D that are identified by the information listing those as the sensors linked to the condition.

Further, the sensor 160b in the position B in FIG. 1 is set with the condition specifying that the user's finger is not touching this sensor if the user's finger is touching any one of the sensors 160c and 160d in the positions C and D that are identified by the information listing those as the sensors linked to the condition.

In this case, the processor 19 selects each of the sensors sequentially as the target for determination and, through association with the information identifying the currently selected sensor as the target for determination, obtains a list of information identifying the sensors linked to the condition set in the management table information. The processor 19 determines that the user's finger is not touching the currently selected sensor as the target for determination if the user's finger is touching any one of the sensors identified by the information included in the obtained list of the information identifying the sensors. The processor 19 then calibrates the sensor currently selected as the target for the determination.

Figure 4:
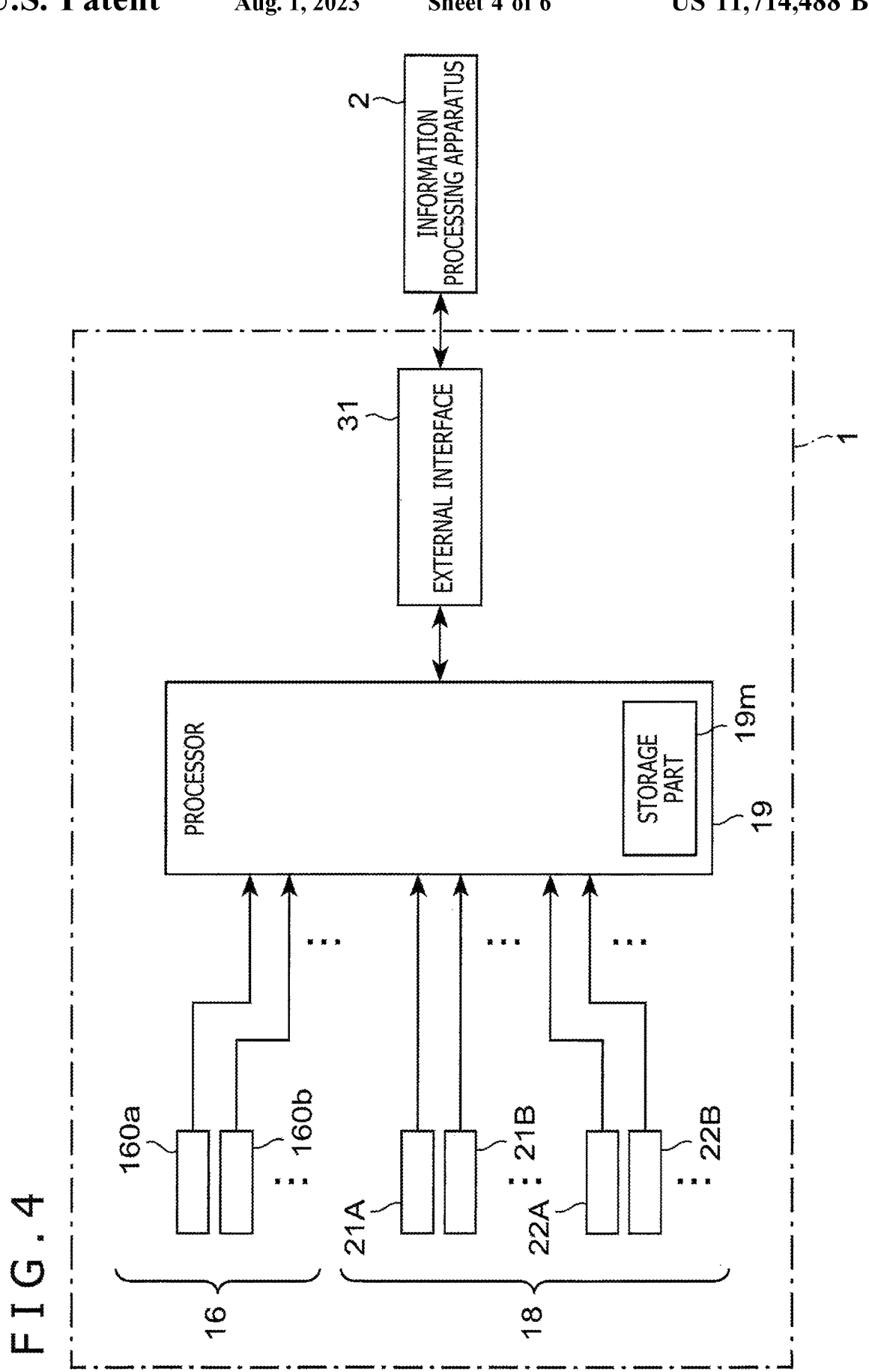
FIG. 4 is a block diagram depicting an exemplary hardware configuration of the controller apparatus embodying the present disclosure.

As depicted in FIG. 4, the controller apparatus 1 of this embodiment includes the sensors 160a, 160b, etc., arranged on the front side of the controller apparatus 1, the multiple first sensors 21 and second sensors 22 arranged on the back side (the side touched by the user's index finger, middle finger, annular finger, and little finger when the user grips the controller apparatus 1), the processor 19, and an external interface 31. The processor 19 has a storage part 19m inside. The external interface 31 is connected with the information processing apparatus 2.

The processor 19 performs the program stored in the storage part 19m. Performing the program enables the processor 19 to determine whether or not to calibrate each of at least some of the sensors 160, 21, and 22 (e.g., each of the sensors 160) at a predetermined timing (e.g., at intervals of a predetermined time).

In performing the above program, the processor 19 references the detected value output from each sensor (the value represented by the output signal) to obtain information regarding whether the user's finger is sufficiently distant from the sensor (when the detected value is below the threshold value D2), the user's finger is touching the sensor (when the detected value is above the threshold value D1), or the user's finger is near the sensor (when the detected value is between the threshold values D2 and D1). The processor 19 outputs the obtained information to the information processing apparatus 2 via the external interface 31.

Further, by performing the above program, the processor 19 executes the following process. The processor 19 sequentially selects each of the sensors set beforehand as the target for calibration and, through association with the information identifying the selected sensor, obtains a list of information identifying the sensors linked beforehand to the predetermined condition.

The processor 19 checks, for each of the sensors included in the obtained list (i.e., each of the sensors linked to the condition), whether or not the detected value output from the sensor linked to the condition of interest exceeds a predetermined threshold value set to represent the state of the sensor being touched by the finger.

If the detected value checked above exceeds the threshold value set to represent the state of the sensor being touched by the finger, the processor 19 performs the process of calibrating the selected sensor. The processor 19 stores the detected value output from the selected sensor as the value representative of the state of the sensor not being touched the user's finger.

On the other hand, if none of the detected values output from the sensors included in the obtained list (i.e., sensors linked to the condition) exceeds the threshold value set to represent the state of the sensor being touched by the finger, the processor 19 performs control not to perform the process of calibrating the selected sensor.

Incidentally, the program performed by the processor 19 and the setting information used by the processor 19 during processing are assumed to be stored in the internal storage part 19m of the processor 19. However, this example is not limitative of this embodiment. The program and the setting information may alternatively be stored in a memory device connected with, but external to, the processor 19.

[Operation]

The controller apparatus 1 as one embodiment of the present disclosure is configured as described above and operates as will be described below. In the description that follows, it is assumed that each sensor is set with the condition specifying that the user's finger is not touching the sensor. Specifically, the processor 19 is assumed to store the management table information depicted in FIG. 5.

The user puts his or her fingers from the index finger to the little finger through the fixing implement 20 of the controller apparatus 1, grips the grip part 11, places the thumb in an operable position on the operation part 12 on the front side, and puts the index finger on the swing button 17. In this state, the user controls the information processing apparatus 2 to start a game application, for example.

Thereafter, when the temperature of the controller apparatus 1 rises, the detected value of a sensor 160, for example, increases even when the sensor is not touched by the user's finger. At a predetermined timing (e.g., at intervals of a predetermined time), the processor 19 determines whether or not to calibrate at least some of the sensors 160, first sensors 21, and second sensors 22 provided in the controller apparatus 1. Here, the sensors targeted for the determination of whether or not to perform calibration may be those set as the target for calibration in the stored management table information being referenced.

Figure 6:
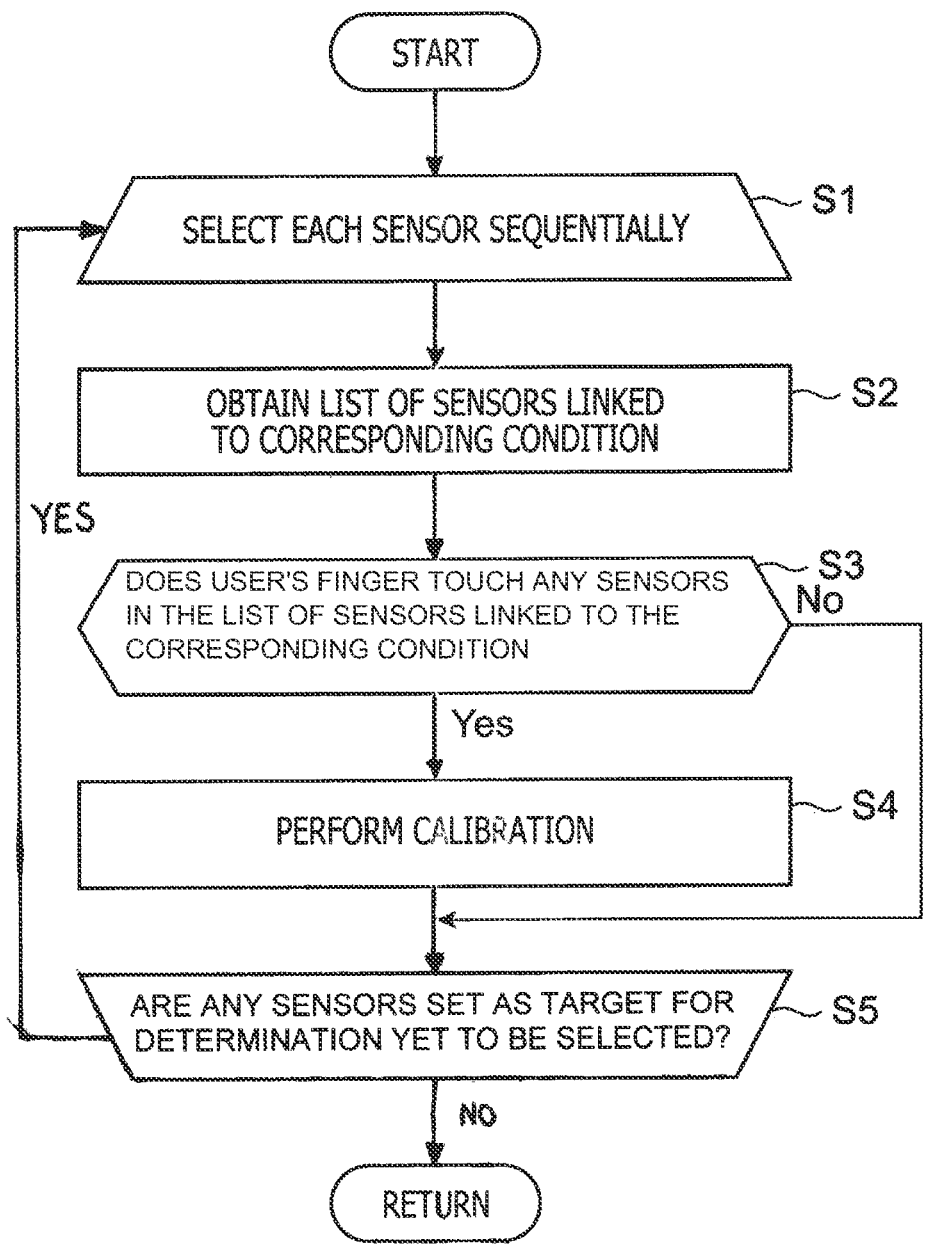
FIG. 6 is a flowchart depicting exemplary operations of the controller apparatus embodying the present disclosure.

The processor 19 starts the process depicted in FIG. 6. The processor 19 sequentially selects each of the sensors set as the target for calibration in the management table information (S1). The processor 19 obtains a list of information identifying the sensors recorded as linked to the condition in the management table information through association with the information identifying the selected sensor (S2). In the example to be discussed below, the sensor selected in step S1 is assumed to be one of the sensors 160 included in the sensor part 16.

The processor 19 checks, for each of the sensors included in the list obtained in step S2 (one of the sensors 160), whether or not the sensor 160 is touched by the user's finger (whether or not the detected value output from the sensor 160 exceeds the threshold value D1 set beforehand to represent the state of the sensor being touched by the finger)(S3).

Here, if the output value output from one of the sensors 160 included in the list obtained in step S2 exceeds the threshold value D1 set to represent the state of the sensor being touched by the finger (Yes in S3), the processor 19 performs the process of calibrating the sensor 160 selected in step S1 (S4).

If any of the sensors set as the target for the determination has yet to be selected in the current process, the processor 19 returns to step S1 to continue the process (S5).

If, in step S3, none of the detected values output from the sensors 160 included in the list obtained in step S2 exceeds the threshold value D1 set to represent the state of the sensor being touched by the finger (No in S3), the processor 19 goes to step S5 to check whether or not any of the sensors set as the target for the determination has yet to be selected in the current process. If any of the sensors has yet to be selected in the current process, the processor 19 returns to step S1 to continue the process. If in step S5 there is no unselected sensor in the current process, the processor 19 terminates the process.

In this process, if the user carries out an operation to touch the sensor 160 in the position A in FIG. 1 with the thumb when it is time to determine whether or not to perform calibration, with the above process being performed on the sensors 160c and 160d, it is determined that the user's finger is touching the sensor 160a listed as linked to the corresponding condition. Consequently, the sensors 160c and 160d are calibrated.

Later, when it is again time to determine whether or not to perform calibration, the user may carry out an operation to touch with the finger on the sensor 160c in the position C in FIG. 1. At this time, with the above process being performed on the sensors 160a and 160b, it is determined that the user's finger is touching the sensor 160c listed as linked to the corresponding condition. Consequently, the sensors 160a and 160b are calibrated.

In this example of the present embodiment, at the time of calibration, there is no need for the information processing apparatus 2 to prompt the user to keep his or her fingers off the sensors 160. Calibration is thus carried out without the user being aware of it.

[Another Example of the Condition for the Determination]

In the above description, it was explained that the condition set for each sensor and specifying that this sensor is not touched by the finger is met when another sensor different from this sensor (or another one of the listed sensors) is touched by the finger. However, this is not limitative of the conditions for the determination.

For example, it can also be determined that the sensor 160 is not touched by the finger when the user is operating the joystick 15 or the button 14 similarly with the thumb. Thus, when going to the above-described step S5, the processor 19 may determine whether the joystick 15 is operated (i.e., tilted) or the button 14 is pressed. Upon determining that the joystick 15 is tilted or the button 14 is pressed, the processor 19 may perform the process of calibrating all sensors 160 included in the sensor part 16.

[Example of Using a Motion Sensor]

In the state where the user is not gripping the controller apparatus 1, the processor 19 may calibrate all sensors (all of the sensors 160, first sensors 21, and second sensors 22).

Here, whether or not the user is gripping the controller apparatus 1 may be determined, for example, as follows. In this example, the controller apparatus 1 is assumed to incorporate an acceleration sensor 25 acting as a motion sensor (indicated by broken lines in FIG. 1).

When the controller apparatus 1 is moved, the acceleration sensor 25 detects acceleration in the direction of the movement on each of the axes (X, Y, and Z axes) in an XYZ orthogonal coordinate system (the Z-axis may stand for the longitudinal direction of the grip part 11 of the controller apparatus 1, the Y-axis may denote an axis oriented from the front side to the back side, and the X-axis may represent an axis perpendicular to both the Z-axis and the Y-axis, for example, depending on the direction in which the acceleration sensor 25 is positioned). The processor 19 references the result of detection by the acceleration sensor 25. When acceleration is detected to be zero on all axes (i.e., a state where the controller apparatus 1 is placed on the table top, for example, without being gripped by the user's hand, the state meeting the condition specifying that the controller apparatus 1 does not detect any movement), the processor 19 checks the output of each of the sensors.

In this state (in which the result of the detection of acceleration on all axes by the acceleration sensor 25 is zero), the processor 19 checks whether or not the detected value from any one of the sensors 160, first sensors 21, and second sensors 22 exceeds the threshold value D2 for determining that the user's finger is not touching the sensor (the threshold value D2 is used for determining that the user's finger is not touching the sensor when the detected value is below the threshold value).

If the detected value from any one of the sensors 160, first sensors 21, and second sensors 22 is below the threshold value D2, the processor 19 performs the process of calibrating that sensor.

[Instructions from the Information Processing Apparatus]

Furthermore, the processor 19 may receive instructions for the timing of calibration from the information processing apparatus 2. In this example, the information processing apparatus 2 gives the controller apparatus 1 an instruction including information for identifying the sensor to be calibrated, the instruction causing the controller apparatus 1 to calibrate the sensor identified by the information.

Given the instruction, the processor 19 calibrates the sensor identified by the information included in the instruction.

[Timing of Calibration]

In the foregoing examples, it was explained that the timing for determining whether or not to perform calibration is a periodical timing. However, this is not limitative of this embodiment. Alternatively, the processor 19 may be provided with a temperature sensor Ts. When the temperature measured by the temperature sensor Ts exceeds or is continuously in excess of a predetermined temperature, the process depicted in FIG. 6 may be carried out at periodic intervals to determine whether or not to perform calibration.

Moreover, the information processing apparatus 2 may be arranged to provide the timing for determining whether or not to perform calibration.

[Example of Referencing a History of Detected Values]

Further, the condition specifying that the sensor is not touched by a user's finger may include a condition based on a history of the output of the sensor.

In this example, the processor 19 obtains and records the detected values of each sensor (each of the predetermined sensors 160, first sensors 21, and second sensors 22) at predetermined intervals. At this time, the processor 19 may record the detected values obtained a predetermined number of times (e.g., 5 times) in the past. In the description that follows, it is assumed that, of the detected values recorded, the value recorded earliest in the past is defined as $V0=V(T0)$, the value recorded second-earliest as $V1=V(T0+2\Delta T)$, . . . , and the detected value recorded nth-earliest as $Vn=V(T0+n\Delta T)$ (n is a natural number).

The processor 19 obtains a difference $Vi+1-Vi$ between the recorded detected values for each sensor when it is time to determine whether or not to perform calibration. Here, as many as n−1 differences are obtained for each sensor. The processor 19 determines whether or not there exists any sensor for which the obtained differences are all below a predetermined threshold value. If there is any such sensor for which all the differences are below the threshold value, the processor 19 calibrates this sensor.

The above condition is based on the assumption that whereas the detected value of a sensor rises abruptly in the case where the user's finger touches the sensor, the rise of the detected value is gradual in the case where the rise is due to environmental factors such as temperature (because the difference between the detected values is relatively small).

[Advantageous Effect of the Embodiment]

Furthermore, the controller apparatus 1 of this embodiment may determine whether or not to perform calibration on each sensor through a combined use of the conditions discussed above. That is, the controller apparatus 1 may select the sensors to be calibrated.

The above-described embodiment calibrates sensors without requiring the user to perform specific operations while the user, unaware of the ongoing calibration, is operating a game application, for example.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2019-086346 filed in the Japan Patent Office on Apr. 26, 2019, the entire content of which is hereby incorporated by reference

What is claimed is:

1. A controller apparatus attached to a hand of a user and having a plurality of sensors, the controller apparatus comprising a processor configured to:

determine, at predetermined intervals, whether to calibrate at least some of the sensors provided in the controller apparatus for a condition specified in a stored management table, wherein the sensors targeted for determination of whether to perform calibration (targeted sensors) are set in the stored management table being referenced;

select one of the targeted sensors;

obtain a list of sensors linked to the condition, with respect to the selected sensor, from the management table, wherein the condition includes that the user's finger is not touching the selected sensor;

check, for each of the sensors included in the list, whether the listed sensor is touched by the user's finger;

calibrate the selected sensor when at least one of the listed sensors is being touched by the user's finger;

wherein calibration of the selected sensor by the processor comprises:

setting a currently detected spatial displacement of the user's finger from the selected sensor as a threshold value indicating that the finger is not touching the selected sensor;

sequentially selecting a next sensor set as a target for determination of whether to perform calibration and determining whether to perform calibration on the selected next sensor when there are sensors yet to be selected, wherein determining whether to perform calibration on the selected next sensor includes:
obtaining a list of sensors linked to the condition, with respect to the selected next sensor, from the management table;
checking, for each of the sensors included in the list, whether the listed sensor is touched by the user's finger; and
calibrating the selected next sensor when at least one of the listed sensors is being touched by the user's finger.

2. The controller apparatus according to claim 1, further comprising:
a motion sensor configured to detect a movement of the controller apparatus,
wherein the condition includes that the motion sensor of the controller apparatus is not detecting any movement.

3. The controller apparatus according to claim 1, wherein, when a predetermined timing has arrived, the calibration includes calibrating the selected sensor and selected next sensors found to meet the condition.

4. The controller apparatus according to claim 3, further comprising:
an output section configured to output details of an operation detected by a sensor to an information processing apparatus connected with the controller apparatus,
wherein the predetermined timing is given by the information processing apparatus.

5. The controller apparatus according to claim 1, further comprising:
a recording section configured to record a history of output from each of the plurality of sensors, wherein the condition is based on the history of the output from the plurality of sensors.

6. The controller apparatus according to claim 1, wherein the user's finger is determined to be touching a sensor when a signal output value of the sensor exceeds a threshold value.

7. The controller apparatus according to claim 1, wherein a spatial displacement S of the user's finger from a sensor is used to determine whether the user's finger is touching the sensor.

8. The controller apparatus according to claim 7, wherein S is determined based on the formula $S=(V-D2)/(D1-D2)$ where V is a signal output value from the sensor, D1 is a threshold value used to indicate that the user's finger is touching the sensor, and D2 is a threshold value used to indicate that the user's finger is sufficiently distant from the sensor.

9. The controller apparatus according to claim 8, wherein the calibration section calibrates the selected sensor and selected next sensors by setting a currently detected signal output value V as the threshold value D2.

10. The controller apparatus according to claim 1, wherein the calibration process includes storing a detected signal value output from the selected sensor or one of the selected next sensors as a value representative of the state of the sensor not being touched by the user's finger.

11. The controller apparatus according to claim 1, further comprising:
a grip part; and
a fixing implement;
wherein the plurality of sensors includes a first set of sensors and a second set of sensors, and
wherein the first and second set of sensors are arranged in a matrix of rows and columns along the grip part and the first set of sensors are positioned in a column adjacent to the second set of sensors in such a manner as to always be in contact with roots of the user's fingers when the user grips the grip part while fastening his or her hand with the fixing implement.

12. A controller apparatus attached to a hand of a user, comprising:
a plurality of sensors; and
a processor configured to:
output information based on an output signal from the sensors through receiving the output signal from the sensors;
determine, at predetermined intervals, whether to calibrate at least some of the sensors provided in the controller apparatus for a condition specified in a stored management table, wherein the sensors targeted for determination of whether to perform calibration (targeted sensors) are set in the stored management table being referenced;
select one of the targeted sensors;
obtain a list of sensors linked to the condition, with respect to the selected sensor, from the management table, wherein the condition includes that the user's finger is not touching the selected sensor;
check, for each of the sensors included in the list, whether the listed sensor is touched by the user's finger;
calibrate the selected sensor when at least one of the listed sensors is being touched by the user's finger;
wherein calibration of the selected sensor by the processor comprises:
setting a currently detected spatial displacement of the user's finger from the selected sensor as a threshold value indicating that the finger is not touching the selected sensor;
sequentially selecting a next sensor set as a target for determination of whether to perform calibration and determining whether to perform calibration on the selected next sensor when there are sensors yet to be selected,
wherein determining whether to perform calibration on the selected next sensor includes:
obtaining a list of sensors linked to the condition, with respect to the selected next sensor, from the management table;
checking, for each of the sensors included in the list, whether the listed sensor is touched by the user's finger; and
calibrating the selected next sensor when at least one of the listed sensors is being touched by the user's finger.

13. The controller apparatus according to claim 12, further comprising:
a motion sensor configured to detect a movement of the controller apparatus,
wherein the condition includes that the motion sensor is not detecting any movement.

14. The controller apparatus according to claim 12, wherein, when a predetermined timing has arrived, the processor calibrates the selected sensor and selected next sensors found to meet the condition.

15. A method of controlling a controller apparatus attached to a hand of a user and having a plurality of sensors, the method comprising:
determining, at predetermined intervals, whether to calibrate at least some of the sensors provided in the controller apparatus for a condition specified in a stored management table, wherein the sensors targeted for determination of whether to perform calibration (targeted sensors) are set in the stored management table being referenced;

selecting one of the targeted sensors;
obtaining a list of sensors linked to the condition, with respect to the selected sensor, from the management table, wherein the condition includes that the user's finger is not touching the selected sensor;
checking, for each of the sensors included in the list, whether the listed sensor is touched by the user's finger;
calibrating the selected sensor when at least one of the listed sensors is being touched by the user's finger;
wherein calibration of the selected sensor comprises:
setting a currently detected spatial displacement of the user's finger from the selected sensor as a threshold value indicating that the finger is not touching the selected sensor;
sequentially selecting a next sensor set as a target for determination of whether to perform calibration and determining whether to perform calibration on the selected next sensor when there are sensors yet to be selected,
wherein determining whether to perform calibration on the selected next sensor includes:
obtaining a list of sensors linked to the condition, with respect to the selected next sensor, from the management table;
checking, for each of the sensors included in the list, whether the listed sensor is touched by the user's finger; and
calibrating the selected next sensor when at least one of the listed sensors is being touched by the user's finger.

16. A non-transitory, computer readable storage medium containing a computer program for a controller apparatus, the controller apparatus for attachment to a hand of a user and having a plurality of sensors, the computer program for the controller apparatus, when executed by a processor, causes the processor to carry out actions, comprising:
determining, at predetermined intervals, whether to calibrate at least some of the sensors provided in the controller apparatus for a condition specified in a stored management table, wherein the sensors targeted for determination of whether to perform calibration (targeted sensors) are set in the stored management table being referenced;
selecting one of the targeted sensors;
obtaining a list of sensors linked to the condition, with respect to the selected sensor, from the management table, wherein the condition includes that the user's finger is not touching the selected sensor;
checking, for each of the sensors included in the list, whether the listed sensor is touched by the user's finger;
calibrating the selected sensor when at least one of the listed sensors is being touched by the user's finger;
wherein calibration of the selected sensor comprises:
setting a currently detected spatial displacement of the user's finger from the selected sensor as a threshold value indicating that the finger is not touching the selected sensor;
sequentially selecting a next sensor set as a target for determination of whether to perform calibration and determining whether to perform calibration on the selected next sensor when there are sensors yet to be selected,
wherein determining whether to perform calibration on the selected next sensor includes:
obtaining a list of sensors linked to the condition, with respect to the selected next sensor, from the management table;
checking, for each of the sensors included in the list, whether the listed sensor is touched by the user's finger; and
calibrating the selected next sensor when at least one of the listed sensors is being touched by the user's finger.

* * * * *